United States Patent [19]
Ito et al.

[11] Patent Number: 5,848,314
[45] Date of Patent: Dec. 8, 1998

[54] EXTERIOR STRUCTURE OF A CAMERA

[75] Inventors: Naoki Ito; Tatsuhide Takebayashi, both of Tokyo, Japan

[73] Assignee: Asahi Kogaku Kogyo Kabushiki Kaisha, Tokyo, Japan

[21] Appl. No.: 931,367

[22] Filed: Sep. 16, 1997

[30]     Foreign Application Priority Data

Sep. 17, 1996   [JP]   Japan .................................... 8-245252

[51] Int. Cl.⁶ .................................................. G03B 17/00
[52] U.S. Cl. ........................................................... 396/535
[58] Field of Search ........................................ 396/535, 6

[56]             References Cited
              U.S. PATENT DOCUMENTS 5,697,005   12/1997   Kikuchi .................................... 396/535
5,708,897   1/1998    Manabe et al. ......................... 396/535

*Primary Examiner*—David M. Gray
*Attorney, Agent, or Firm*—Greenblum & Bernstein, P.L.C.

[57]             ABSTRACT

An exterior structure of a camera includes a first exterior member, a second exterior member and a cover member. The first exterior member is provided with a hole and an elastically deformable first finger. The second exterior member is provided with an elastically deformable second finger which can be engaged by the first finger of the first exterior member when the first and second exterior members are fitted together. The cover member is adapted to close the hole of the first exterior member and is provided with an elastically deformable third finger. The third finger is inserted into the hole of the first exterior member to engage with the edge of the hole.

18 Claims, 7 Drawing Sheets

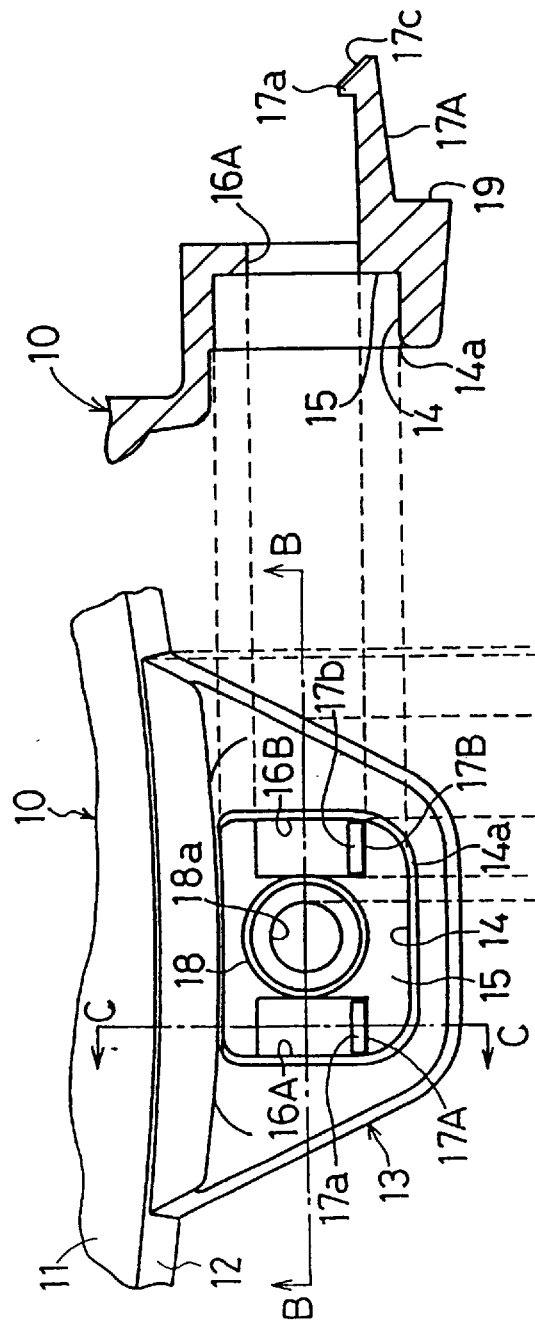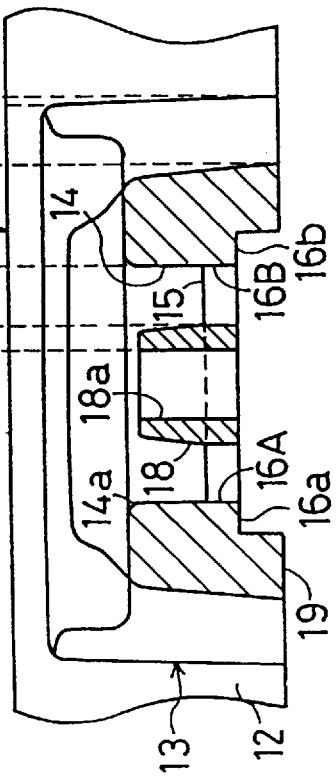

EXTERIOR STRUCTURE OF A CAMERA

BACKGROUND OF THE INVENTION

1. Field of the Invention

The present invention relates to an exterior structure of a camera.

2. Description of the Related Art

In an interchangeable lens camera, an annular lens mount is provided on the periphery thereof with a first exterior member which is in turn provided with a mount unlocking (releasing) button. An front (upper) edge of a second exterior member is positioned (superimposed) on the rear (lower) edge of the first exterior member to connect the first and second exterior members.

To attach the mount unlocking button to the first exterior member, the mount unlocking button is provided with fingers that can be engaged by the first exterior member.

The first and second exterior members are interconnected in the vicinity of the mount unlocking button by means of screws, independent of the mounting mechanism between the mount unlocking button and the first exterior member. Consequently, the number of elements is increased, which results in a complicated assembling of the exterior members. This is also a drawback of other similar members of the camera.

SUMMARY OF THE INVENTION

It is an object of the present invention to provide exterior members of a camera which can be manufactured at a low cost and can be easily assembled.

To achieve the object mentioned above, according to an aspect of the present invention, there is provided an exterior structure of a camera having a first exterior member, a second exterior member and a cover member. The first exterior member is provided with a hole and an elastically deformable first finger which projects from the edge of the hole in the direction of the depth of the hole. The second exterior member is provided with an elastically deformable second finger which can be engaged by the first finger of the first exterior member when the first and second exterior members are fitted to each other. The cover member is adapted to close the hole of the first exterior member. The cover member is provided with an elastically deformable third finger which is inserted into the hole of the first exterior member to engage with the edge of the hole.

The first exterior member, the second exterior member and the cover member can be made of synthetic resin or metal. Preferably, they are made from an injection mold of synthetic resin. The first, second and third fingers of the first exterior member, the second exterior member and the cover member are elastically deformable.

The first finger of the first exterior member is preferably provided on its front end with an engagement portion protruding toward the inward portion of the hole of the first exterior member.

When a predetermined portion of the first exterior member and a predetermined portion of the second exterior member are disposed on one another, the first finger of the first exterior member engages with the second finger of the second exterior member to connect the first and second exterior members. When the hole of the first exterior member is closed by the cover member, the third finger of the latter engages with the edge of the hole to mount the cover member to the first exterior member. Consequently, the assembling operation is simplified in comparison with the prior art in which the interconnection is achieved by the engagement of the fingers as well as the use of screws.

The elastically deformable first finger of the first exterior member projects from the edge of the hole in the direction of the depth of the hole and is provided on the front end thereof with an engagement portion that projects toward the inward portion of the hole. It follows that the molding die, which is adapted to mold the first exterior member, can be provided with a projection which extends through the hole up to the front end of the first finger. Consequently, the structure of the molding die used to mold the first exterior member is simpler than that of the molding die used to mold a first exterior member having a first finger located at a position different from that of the above-mentioned first finger in the present invention. Thus, according to the present invention, the manufacturing cost of the exterior members can be reduced.

Moreover, according to the present invention, the third finger of the cover member engages with the edge of the hole of the first exterior member, which contributes to a simplification of the molding die assembly to connect the cover member to the first exterior member. Thus, not only can the hole be effectively used, but also the three members (first, second exterior members and cover member) can be easily assembled by the engagement of the three adjacent fingers.

In an embodiment, the first exterior member is provided to surround an annular lens mount of the camera and the cover member is a mount unlocking button which is adapted to move a photographing lens locking pin extending through the lens mount in the axial direction thereof. A compression coil return spring can be provided between the mount unlocking button and the first exterior member.

With this arrangement, the mount unlocking button has a function to cover the hole in addition to its inherent functions.

The cover member can be a lid to close the hole of the first exterior member. The first exterior member and/or the second exterior member and/or the cover member can be made of an injection mold of synthetic resin.

The first and second exterior members are preferably provided with edge portions which can be superimposed. When the edge portions are superimposed, the first finger of the first exterior member engages with the second finger of the second exterior member.

The present disclosure relates to subject matter contained in Japanese Patent Application No. 8-245252 (filed on Sep. 17, 1996) which is expressly incorporated herein by reference in its entirety.

BRIEF DESCRIPTION OF THE DRAWINGS

The invention will be described below in detail with reference to the accompanying drawings, in which:

FIG. 2A is a front elevational view of a first exterior member in the vicinity of a mount unlocking button shown in FIG. 1;

FIGS. 2B and 2C are sectional views of the first exterior member in the vicinity of the mount unlocking button shown in FIG. 1, taken along the lines B—B and C—C in FIG. 2A, respectively;

DESCRIPTION OF THE PREFERRED EMBODIMENT

Figure 1:
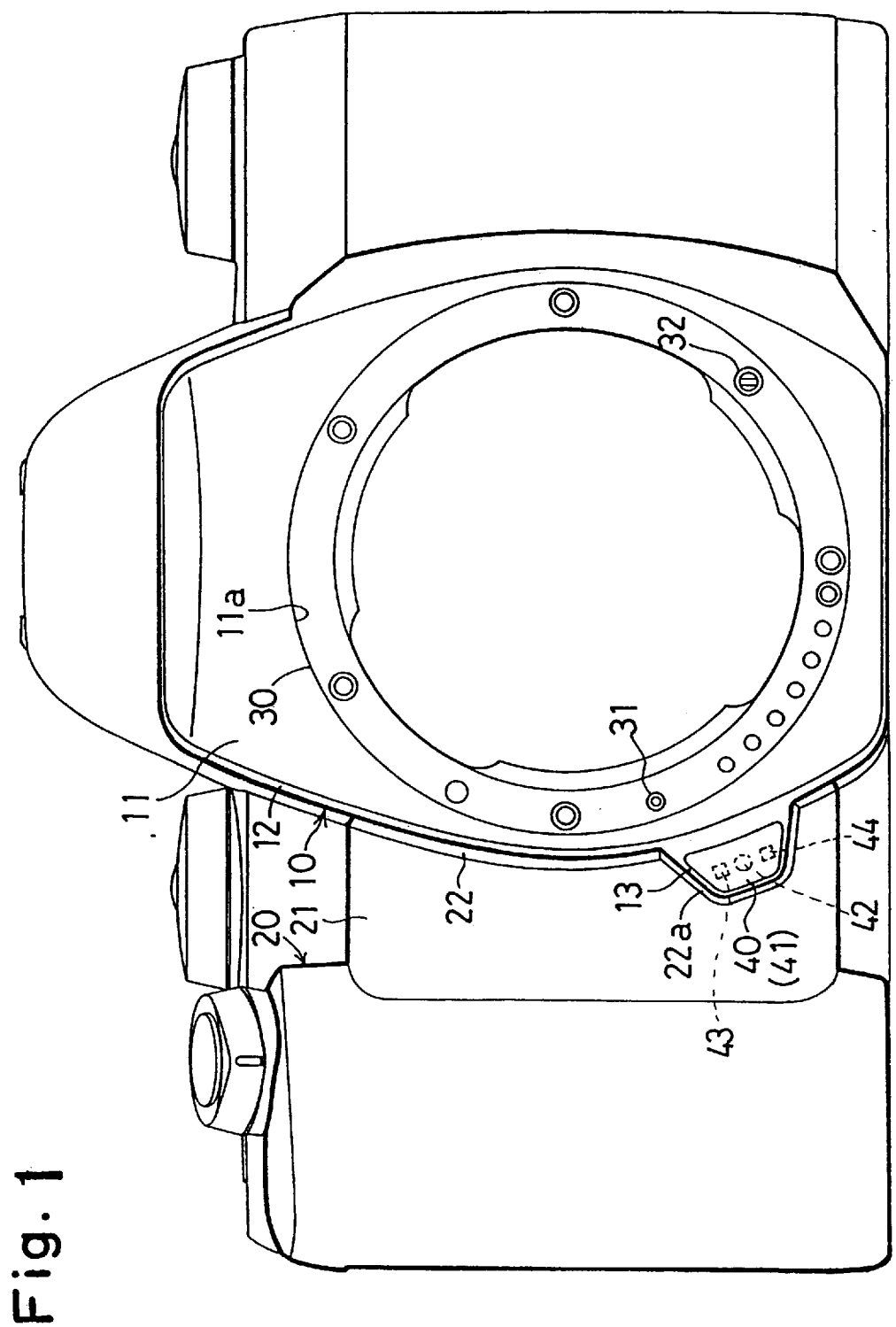
FIG. 1 is a front elevational view of a camera when a photographing lens is not attached, according to an embodiment of the present invention.

The front outside portion of a camera consists of a first exterior member 10 made of synthetic resin, a second exterior member 20 made of synthetic resin, and other exterior members. The first exterior member 10 serves as a front decoration member, while the second exterior member 20 serves as a grip member. In FIG. 1 for the purposes of clarity, the boundary between the first and second exterior members 10 and 20 is indicated by a thick solid line.

The first exterior member 10 includes a main portion 11 and an operation base portion 13. The main portion 11 is provided with a peripheral (convex) edge 12. The operation base portion 13 projects from the peripheral edge 12. The second exterior member 20 includes a main portion 21. The main portion 21 is provided with a leg 22 having a recess 22a. The lower surface of the peripheral edge 12 is positioned on the upper surface of the leg 22 to engage with each other.

The first exterior member 10 is provided with a circular center opening 11a in which an annular lens mount 30 is fitted. The lens mount 30 is provided with a lock pin 31 extending therethrough which is adapted to detachably attach a photographing lens (not shown), and an autofocusing lens drive pin 32 extending through the lens mount 30. When a mount unlocking (releasing) button 40 attached to the operation base portion 13 is actuated (depressed), the lock pin 31 and the lens drive pin 32 are moved in an axial direction, i.e., in a direction perpendicular to the sheet of the drawings (FIG. 1), so that they are retracted from the surface of the lens mount 30.

The shapes of the operation base portion 13 of the first exterior member 10 and the surroundings thereof will be discussed below with reference to FIGS. 2A through 2C.

The operation base portion 13 is provided on the center portion thereof with a substantially rectangular recess 14 having a bottom plate 15. The bottom plate 15 is provided with a pair of holes 16A and 16B. The holes 16A and 16B are provided on corresponding edges with fingers 17A and 17B which project in the direction of the depth of the holes. The fingers 17A and 17B are provided on the distal ends thereof with hooks 17a and 17b which project inward of the holes 16A and 16B.

A cylindrical portion 18 is provided on the bottom plate 15 between the holes 16A and 16B. A connection surface (rear surface) 19 is formed at the rear (lower) surface of the operation base portion 13. The surface 19 is flush with and is connected to the rear surface of the edge 12.

The recess 14 is provided on the front (upper) edge thereof with an oblique surface 14a. The finger 17A (finger 17B) is provided on the distal end thereof with an oblique surface 17c. The oblique surfaces 14a and 17c facilitate the assembling of the elements.

Figure 3:
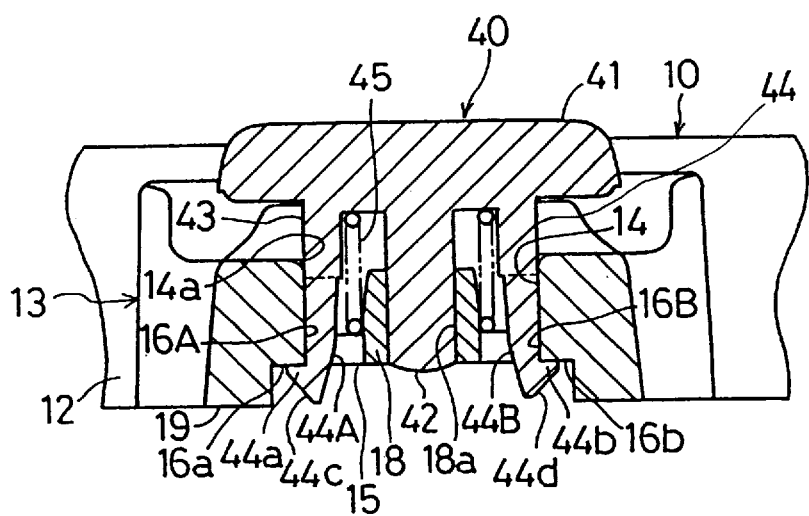
FIG. 3 is a sectional view of the mount unlocking button attached to the portion of the first exterior member shown in FIG. 2B.

The mount unlocking button 40 is attached to the operation base portion 13 as can be seen in FIG. 3.

The mount unlocking button 40 is provided with a head 41 having a substantially trapezoidal plan shape (as viewed in FIG. 1). The head 41 is in turn provided with a cylindrical shaft 42, on the bottom center portion thereof, and with a substantially square hollow pillar 43 which surrounds the shaft 42. The cylindrical shaft 42 is inserted in the hole 18a of the cylindrical portion 18 and the square hollow pillar 43 is fitted in the recess 14. Fingers 44A and 44B are formed on opposed rear (lower) edges of the hollow pillar 43. The fingers 44A and 44B are provided on the front ends thereof with hooks (engaging portions) 44a and 44b that are engaged by the lower edges 16a and 16b of the holes 16A and 16b, respectively. The hooks 44a and 44b are provided on the front ends thereof with oblique surfaces 44c and 44d that facilitate the attachment of the mount unlocking button 40 to the operation base portion 13.

The shape of the recess 22a of the second member 20 and the surroundings thereof will be discussed below with reference to FIGS. 4A and 4B.

The connection surface (front surface) 23 of the leg 22 including the recess 22a has a uniform height, so that the connection surface 19 of the operation base portion 13 is positioned (superimposed) on top of the connection surface 23. The recess 22a is provided therein with a pair of fingers 24A and 24B which are integral with the recess 22a at the sides thereof. The fingers 24A and 24B are provided on the front (upper) surface thereof with hooks (engaging portion) 24a, 24b which engage with the hooks 17a, 17b of the fingers 17A, 17B, respectively. The fingers 24A and 24B are provided with oblique surfaces 24c and 24d that make it possible to easily assemble the first and second exterior members 10 and 20.

Figure 5:
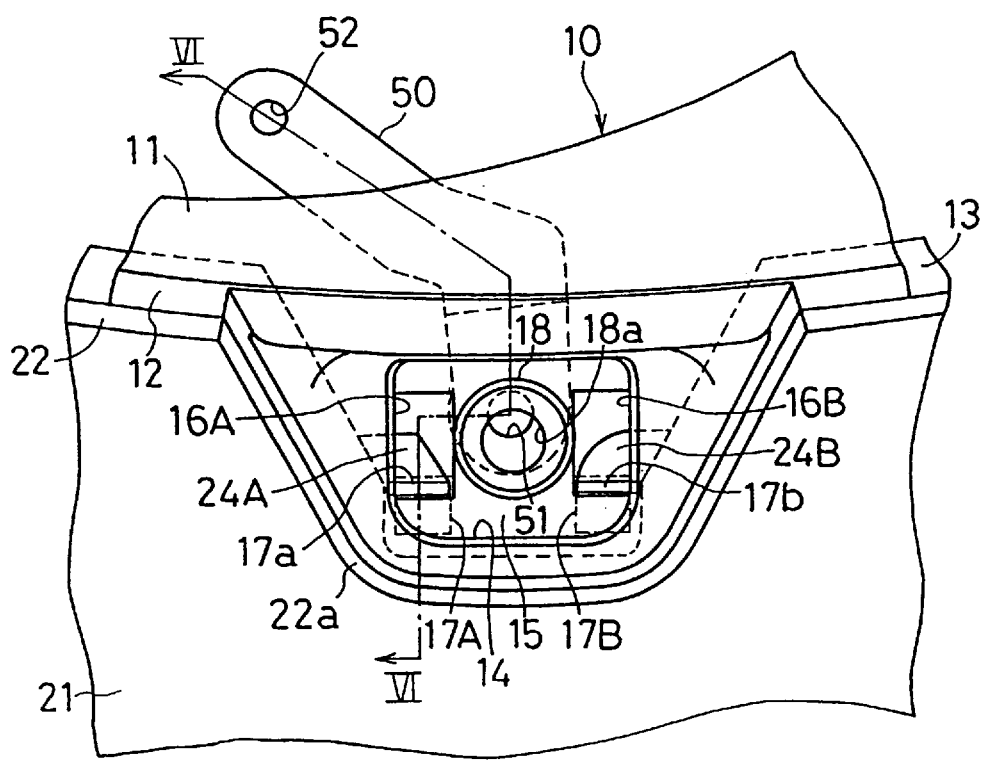
FIG. 5 is a front elevational view of the first exterior member shown in FIG. 2A attached to the second exterior member shown in FIGS. 4A and 4B.

The superimposition and the engagement of the first and second exterior members are shown in FIG. 5.

Figure 6:
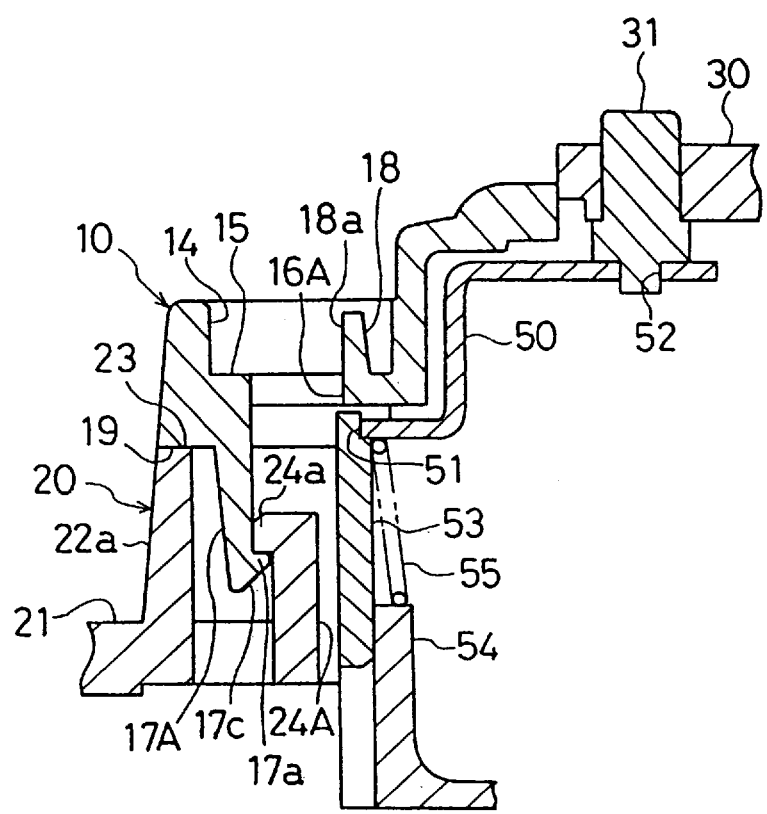
FIG. 6 is a sectional view taken along the line VI—VI in FIG. 5.

In FIG. 5, a connection member 50 is additionally provided below (rear) the first exterior member 10 (i.e., the direction from the front to the back of the camera). In FIG. 6 which is a sectional view taken along the line VI—VI in FIG. 5, elements related to the connection member 50 are additionally shown.

The connection member 50 is provided on opposite ends thereof with holes 51 and 52 in which one end of a pin 53 and one end of the lock pin 31 are inserted and secured, respectively. The other end of the pin 53 is inserted in the hole of a cylindrical guide portion 54. A compression coil spring 55 is provided between the front end of the cylindrical guide portion 54 and the connection member 50 to bias the lock pin 31 forwardly through the connection member 50.

The first and second exterior members 10 and 20 and the mount unlocking button 40, constructed as described above, are assembled as follows.

Figure 4:
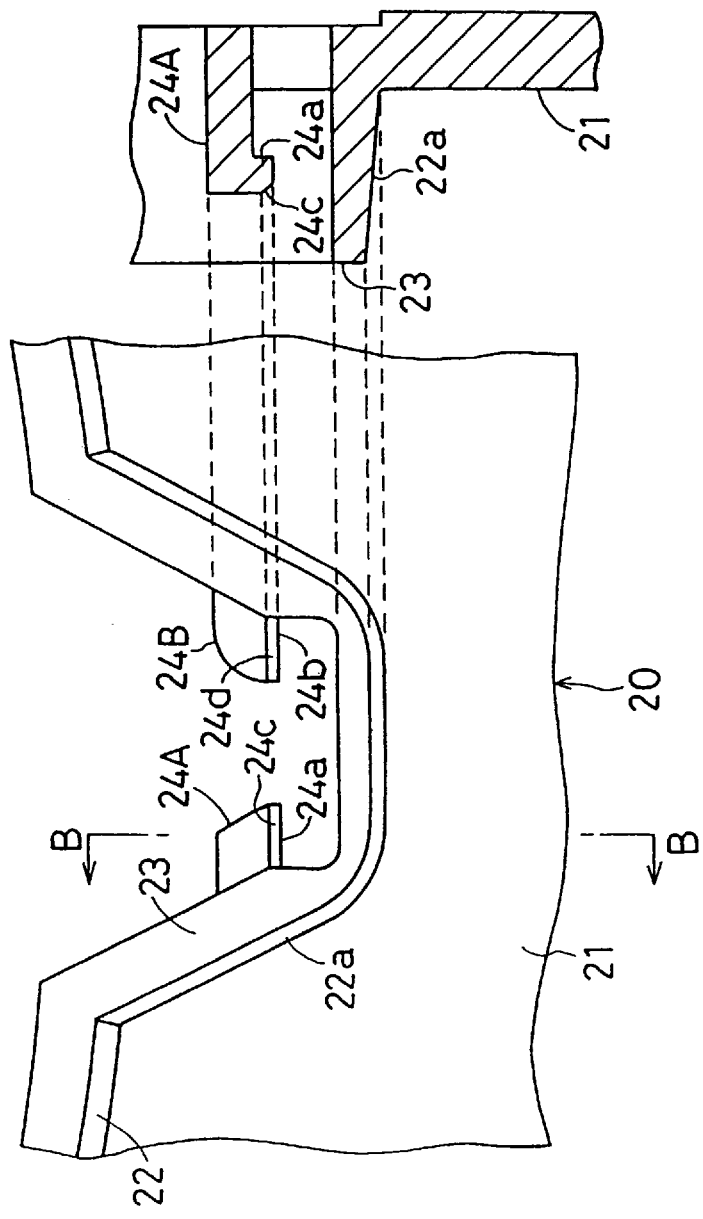
FIGS. 4A and 4B show a second exterior member in the vicinity of the mount unlocking button.

The connection surface 19 of the first exterior member shown in FIGS. 2A through 2C is positioned (superimposed) on the connection surface 23 of the second exterior member 20 shown in FIGS. 4A and 4B, as shown in FIG. 5. Here, the oblique surface 17c abuts against the oblique surface 24c. Thereafter, the finger 17A is moved downward while being slightly bent due to its elastic deformability. The finger 17A which has been slightly and elastically bent is automatically returned to its initial position as soon as the hook (engaging portion) 17a engages with the hook (engaging portion) 24a. The hooks (engaging portions) 17b and 24b are engaged with each other at the same time and in the same way as the engagement between the hooks (engaging portions) 17a and 24a.

In FIG. 3, a compression coil spring 45 is provided around the cylindrical portion 18 and the shaft 42 of the mount unlocking button 40 is inserted in the cylindrical portion 18, so that the mount unlocking button 40 is attached to the operation base portion 13. During the insertion of the mount unlocking button 40, the hooks 44a and 44b thereof abut against the oblique surfaces 14a of the recess 14 and thereafter, the fingers 44A and 44B are slightly bent due to their own elastic deformability toward each other when they move in the recess 14. The fingers 44A and 44B which have been slightly and elastically bent are returned to their initial position as soon as the hooks (engaging portions) 44a and 44b engage with the lower edges 16a and 16b of the holes 16A and 16B, respectively. Thus, the first and second exterior members 10 and 20 and the mount unlocking button 40 can be easily assembled.

It is possible to mount the mount unlocking button 40 to the first exterior member 10 prior to the engagement of the first exterior member 10 with the second exterior member 20.

The photographing lens is attached and detached to the exterior structure (mount structure), assembled as described above, as follows.

In FIGS. 3 and 6, when the mount unlocking member 40 is depressed against the spring force of the compression coil springs 45 and 55, the front end of the shaft 42 moves the connection member 50 downward. During the downward movement of the connection member 50, the pin 53 is guided by the cylindrical guide portion 54 and the lock pin 31 is moved in the axial direction (downward direction as viewed in FIG. 6) to retract from the lens mount 30. Since the connection member 50 is connected to the lens drive pin 32 shown in FIG. 1 through an intermediate member (not shown), the lens drive pin 32 is moved downward in association with the downward movement of the lock pin 31. Thus, the photographing lens (not shown) is free to rotate about the axes of the lens and the lens mount 30. When the photographing lens is rotated by a predetermined angle, the photographing lens can be detached. When the mount unlocking button 40, which has been depressed, is released, the button 40 is automatically returned to the initial position by the spring force of the compression coil springs 45 and 55.

The first exterior member 10 can be manufactured at low cost because of the following reasons.

Figure 7A:
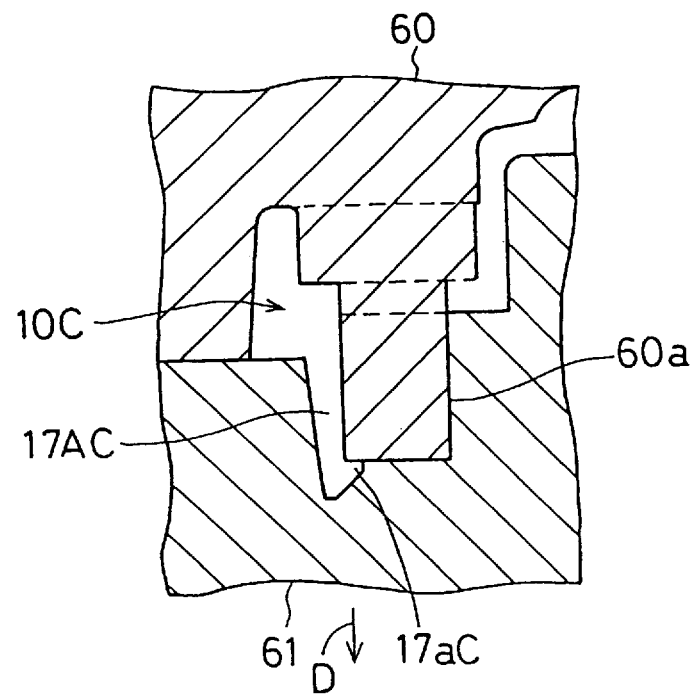
FIG. 7A is a sectional view of an injection molding die for the first exterior member shown in FIG. 2; and, FIG. 7B is a sectional view similar to FIG. 7A, for comparison with FIG. 7A.

FIG. 7A shows an example of an injection molding die assembly for the first exterior member 10. Portions 17AC and 17aC of a mold cavity 10C defined by a stationary die 60 and a movable die 61 correspond to the finger 17A and the hook 17a shown in FIG. 2C, respectively. Parts of the hole 16A and the finger 17A shown in FIG. 2C are formed by a projection 60a of the stationary die 60.

In FIG. 7A, first, melted synthetic resin is introduced into the cavity 10C. After the synthetic resin has set, the movable die 61 is moved relative to the stationary die 60 in the direction D. Then the molded first exterior member 10 is pushed by a pin (not shown) and separated from the stationary die 60.

Figure 7B:
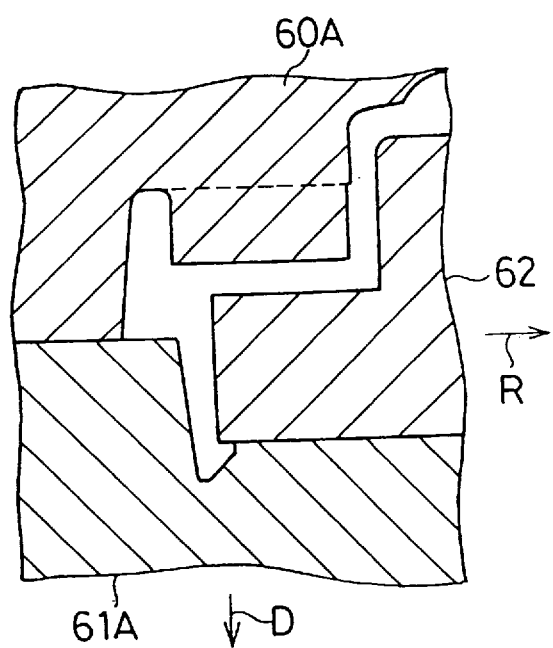

According to the die assembly, which is adapted to mold the first exterior member 10 mentioned above, the projection 60a of the stationary die 60 contributes to a simplification of the injection molding die. Namely, if the finger 17A was formed at the portion in which there is no hole 16A in FIG. 2C, two movable dies consisting of a first movable die 61A which is movable relative to the stationary die 60A in the direction D and a second movable die 62 which is movable relative to the stationary die 60A in the direction R perpendicular to the direction D, must be provided, as shown in FIG. 7B. Namely, three molding dies in total are necessary in FIG. 7B, but only two dies are necessary in FIG. 7A. Consequently, the die arrangement shown in FIG. 7A is simpler than that shown in FIG. 7B, and hence the manufacturing cost of the first exterior member can be reduced in the present invention.

The present invention is not limited to the embodiments discussed above or illustrated in the drawings and can be modified as follows.

For instance, the number of holes 16A and 16B is not limited to two and can be one or more than two. The number of fingers 17A and 17B corresponds to that of the holes 16A and 16B.

The present invention can be generally applied to outside or external members of a camera, such as an exterior member of a portion surrounding a shutter button, etc.

The mount unlocking button 40 can be replaced by a simple lid which only closes the holes 16A and 16B, when the mount unlocking member 40 is not adapted.

What is claimed is:

1. An exterior structure of a camera, comprising:
   a first exterior member which is provided with a hole and an elastically deformable first finger which projects from an edge of said hole in a direction of a depth of said hole;
   a second exterior member which is provided with an elastically deformable second finger which can be engaged with said first finger of said first exterior member when said first and second exterior members are fitted to each other, said first and second exterior members covering at least a portion of an outer surface of said camera; and
   a cover member which is adapted to close said hole of said first exterior member and which is provided with an elastically deformable third finger which is inserted into said hole of said first exterior member (so as) to engage with said edge of said hole.

2. An exterior structure of a camera according to claim 1, wherein said first exterior member comprises a member which surrounds an annular lens mount of said camera and wherein said cover member comprises a mount unlocking button which is adapted to move a photographing lens locking pin extending through said lens mount in an axial direction thereof.

3. An exterior structure of a camera according to claim 2, further comprising a return spring provided between said mount unlocking button and said first exterior member.

4. An exterior structure of a camera according to claim 1, wherein said cover member comprises a lid to close said hole of said first exterior member.

5. An exterior structure of a camera according to claim 1, wherein said first exterior member, said second exterior member and said cover member are made of synthetic resin.

6. The exterior structure of a camera according to claim 1, wherein said first exterior member is made by an injection molding of synthetic resin.

7. An exterior structure of a camera according to claim 1, wherein said first and second exterior members are provided with edge portions which can be superimposed, so that, said first finger of said first exterior member engages with said second finger of said second exterior member.

8. An exterior structure of a camera according to claim 1, wherein said first finger of said first exterior member is provided on a front end with an engagement portion protruding toward an inward portion of said hole of said first exterior member.

9. An exterior structure of a camera, comprising:
- a first exterior member which is provided with a main portion and an operation base portion protruding from said main portion, said main portion being provided with a circular center opening in which an annular lens mount is fitted;
- a hole and an elastically deformable first finger which projects from an edge of said hole in a direction of the depth of said hole, said hole and said first finger being provided on said operation base portion of said first exterior member;
- a second exterior member which is provided with an elastically deformable second finger which is inserted into said hole and is engaged with said first finger of said first exterior member, said first exterior member and said second exterior member being provided with edges which are superimposed on each other; and
- a cover member which is adapted to close said hole of said first exterior member.

10. The exterior structure of a camera according to claim 9, further comprising a cylindrical portion which is provided on said first exterior member, and a shaft which is provided on said cover member and is slidably inserted into said cylindrical portion.

11. An exterior structure of a camera according to claim 10, wherein a pair of said hole and said first and second finger are provided on opposite sides of said cylindrical portion.

12. The exterior structure of a camera according to claim 9, wherein said cover member is provided with a third finger which is inserted into said hole of said first exterior member and engages with said edge of said hole.

13. An exterior structure of a camera, comprising:
- a first exterior member which covers a front center portion of a body of said camera, said first exterior member being provided with a main portion and an operation base portion protruding from said main portion, said main portion being provided with a circular center opening in which an annular lens mount is fitted;
- a hole and an elastically deformable first finger which projects from an edge of said hole in a direction of a depth of said hole, said hole and first finger being provided on said operation base portion of said first exterior member;
- a second exterior member which forms a grip portion of said camera, said second exterior member being provided with an elastically deformable second finger which is inserted into said hole and is engaged with said first finger of said first exterior member; and
- a mount unlocking button which is adapted to close said hole of said first exterior member, said mount unlocking button being adapted to move a photographing lens locking pin extending through said lens mount in an axial direction thereof.

14. An exterior structure of a camera according to claim 13, wherein said first exterior member and said second exterior member are provided with edges which are superimposed on each other.

15. The exterior structure of a camera according to claim 13, further comprising a cylindrical portion which is provided on said first exterior member, and a shaft which is provided on said mount unlocking button and is slidably inserted into said cylindrical portion.

16. An exterior structure of a camera according to claim 15, wherein a pair of said hole and said first and second finger are provided on opposite sides of said cylindrical portion.

17. The exterior structure of a camera according to claim 13, wherein said mount unlocking button is provided with a third finger which is inserted into said hole of said first exterior member and engages with said edge of said hole.

18. An exterior structure of a camera according to claim 13, wherein said first exterior member, said second exterior member and said mount unlocking button are made of synthetic resin.

* * * * *